(12) United States Patent
Gorbach et al.

(10) Patent No.: US 9,894,040 B2
(45) Date of Patent: Feb. 13, 2018

(54) TRUST SERVICES FOR SECURING DATA IN THE CLOUD

(75) Inventors: Irina Gorbach, Bellevue, WA (US); Venkatesh Krishnan, Sammamish, WA (US); Andrey Shur, Redmond, WA (US); Dmitry Denisov, Bellevue, WA (US); Lars Kuhtz, Seattle, WA (US); Sumalatha Adabala, Redmond, WA (US); Roy Peter D'Souza, Bellevue, WA (US); Michael Entin, Redmond, WA (US); Michael Ray Clark, Redmond, WA (US); Gitika Aggarwal Saubhasik, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 526 days.

(21) Appl. No.: 13/609,945

(22) Filed: Sep. 11, 2012

(65) Prior Publication Data

US 2014/0075184 A1 Mar. 13, 2014

(51) Int. Cl.
*H04L 29/06* (2006.01)
*G06F 21/62* (2013.01)
(Continued)

(52) U.S. Cl.
CPC ........ *H04L 63/04* (2013.01); *G06F 17/30197* (2013.01); *G06F 21/6218* (2013.01); *H04L 63/06* (2013.01); *H04L 63/20* (2013.01); *G06F 8/61* (2013.01); *G06F 2221/2107* (2013.01); *G06F 2221/2115* (2013.01); *H04L 2463/062* (2013.01)

(58) Field of Classification Search
USPC .......................................................... 713/155
See application file for complete search history.

(56) References Cited

U.S. PATENT DOCUMENTS

| 3,781,472 | A | 12/1973 | Goode | |
|---|---|---|---|---|
| 6,192,130 | B1 * | 2/2001 | Otway | ............... G06Q 20/3672 380/1 |

(Continued)

FOREIGN PATENT DOCUMENTS

JP 2010200210 9/2010

OTHER PUBLICATIONS

Meyer, B. "Schema Evolution: Concepts, Terminology, and Solutions", Oct. 1996, Computer, vol. 29:10, p. 1-3.
(Continued)

*Primary Examiner* — Harris C Wang
(74) *Attorney, Agent, or Firm* — Workman Nydegger (57) ABSTRACT

Embodiments are directed to securing data in the cloud, securely encrypting data that is to be stored in the cloud and to securely decrypting data accessed from the cloud. In one scenario, an instantiated trust service receives information indicating that a trust server is to be instantiated. The trust service instantiates the trust server, which is configured to store key references and encrypted keys. The trust service receives the public key portion of a digital certificate for each publisher and subscriber that is to have access to various specified portions of encrypted data. A data access policy is then defined that specifies which encrypted data portions can be accessed by which subscribers.

20 Claims, 5 Drawing Sheets

(51) Int. Cl.
*G06F 17/30* (2006.01)
*G06F 9/445* (2018.01)

(56) References Cited

U.S. PATENT DOCUMENTS

| | | | |
|---|---|---|---|
| 6,513,116 B1* | 1/2003 | Valente | H04L 63/04 |
| | | | 713/155 |
| 6,574,733 B1* | 6/2003 | Langford | G06F 21/602 |
| | | | 713/193 |
| 6,584,565 B1 | 6/2003 | Zamek | |
| 6,611,925 B1 | 8/2003 | Spear | |
| 6,832,317 B1 | 12/2004 | Strongin | |
| 7,467,157 B1 | 12/2008 | Chen et al. | |
| 7,571,315 B1 | 8/2009 | Smith | |
| 7,962,750 B1 | 6/2011 | Gruse et al. | |
| 8,191,040 B2 | 5/2012 | Hejlsberg et al. | |
| 8,346,807 B1 | 1/2013 | Diamond et al. | |
| 8,392,709 B1 | 3/2013 | Agrawal | |
| 8,479,008 B2 | 7/2013 | Lin | |
| 8,819,770 B2 | 8/2014 | Entin et al. | |
| 8,959,351 B2 | 2/2015 | Gorbach et al. | |
| 9,189,648 B2 | 11/2015 | Entin et al. | |
| 2002/0087859 A1 | 7/2002 | Weeks | |
| 2003/0182555 A1 | 9/2003 | Labaton | |
| 2004/0128544 A1 | 7/2004 | Hondo | |
| 2005/0044369 A1 | 2/2005 | Anantharaman | |
| 2005/0055358 A1 | 3/2005 | Krishnaparasad et al. | |
| 2005/0223242 A1* | 10/2005 | Nath | G06F 21/6209 |
| | | | 713/193 |
| 2006/0174124 A1 | 8/2006 | Bell | |
| 2006/0190716 A1 | 8/2006 | Miller | |
| 2006/0259762 A1 | 11/2006 | Tanimoto | |
| 2007/0050395 A1 | 3/2007 | Hunter | |
| 2007/0079126 A1 | 4/2007 | Hsu | |
| 2008/0126397 A1 | 5/2008 | Alexander et al. | |
| 2008/0162521 A1 | 7/2008 | Browning | |
| 2008/0288516 A1 | 11/2008 | Hadfield | |
| 2008/0289023 A1 | 11/2008 | Wardrop | |
| 2008/0313469 A1 | 12/2008 | Giblin | |
| 2009/0041249 A1 | 2/2009 | Tanaka | |
| 2009/0048953 A1 | 2/2009 | Hazel | |
| 2009/0129596 A1 | 5/2009 | Chavez | |
| 2009/0141891 A1 | 6/2009 | Boyen | |
| 2009/0208015 A1* | 8/2009 | Kamat | G06F 21/10 |
| | | | 380/277 |
| 2010/0095118 A1 | 4/2010 | Meka | |
| 2010/0125523 A1 | 5/2010 | Solomon | |
| 2010/0161995 A1 | 6/2010 | Browning | |
| 2010/0211782 A1* | 8/2010 | Auradkar | H04L 9/083 |
| | | | 713/168 |
| 2010/0325732 A1 | 12/2010 | Mittal | |
| 2011/0071994 A1 | 3/2011 | Tabrizi | |
| 2011/0078375 A1* | 3/2011 | Shepherd et al. | 711/115 |
| 2011/0131627 A1 | 6/2011 | Abendroth | |
| 2011/0145593 A1* | 6/2011 | Auradkar | G06F 21/6218 |
| | | | 713/189 |
| 2012/0054848 A1 | 3/2012 | Salowey | |
| 2012/0079569 A1 | 3/2012 | Mendelovich | |
| 2012/0102329 A1 | 4/2012 | Mittal | |
| 2012/0110646 A1 | 5/2012 | Ajitomi | |
| 2012/0110654 A1 | 5/2012 | Alrabady | |
| 2012/0240192 A1 | 9/2012 | Orazi | |
| 2012/0284090 A1 | 11/2012 | Marins | |
| 2012/0284506 A1 | 11/2012 | Kravitz | |
| 2012/0317655 A1 | 12/2012 | Zhang et al. | |
| 2013/0096943 A1 | 4/2013 | Carey et al. | |
| 2013/0111217 A1 | 5/2013 | Kopasz | |
| 2013/0276086 A1* | 10/2013 | Yu | H04L 63/00 |
| | | | 726/9 |
| 2014/0075184 A1* | 3/2014 | Gorbach | H04L 63/06 |
| | | | 713/155 |
| 2014/0075196 A1* | 3/2014 | Gorbach | H04L 9/321 |
| | | | 713/175 |
| 2014/0101713 A1 | 4/2014 | Entin | |
| 2014/0115327 A1 | 4/2014 | Gorbach et al. | |
| 2015/0143127 A1 | 5/2015 | Gorbach et al. | |

OTHER PUBLICATIONS

Mei, H. et al. "A Compositional Claim-Based Component Certification Procedure", IEEE, 2004, p. 620-626.
Lie, Wei et al. "VegasFS a Prototype for File-Sharing Crossing Multiple Administrative Domains", IEEE, 2003, p. 224-231.
Harding et al. "Wireless Authenticaiton Using Remote Passwords", ACM, Mar. 2008, p. 24-29.
Mizuno et al. "Authentication Using Multiple Communication Channels", ACM, Nov. 2005, p. 54-62.
U.S. Appl. No. 13/614,988, dated Aug. 16, 2013, Office Action.
U.S. Appl. No. 13/657,246, dated Mar. 10, 2014, Office Action.
U.S. Appl. No. 13/644,921, dated Apr. 25, 2014, Notice of Allowance.
U.S. Appl. No. 13/614,988, dated May 6, 2014, Office Action.
U.S. Appl. No. 13/657,246, dated Jul. 16, 2014, Office Action.
U.S. Appl. No. 13/614,988, dated Oct. 2, 2014, Notice of Allowance.
U.S. Appl. No. 14/459,081, dated Apr. 10, 2015, Office Action.
U.S. Appl. No. 14/459,081, dated Jul. 17, 2015, Notice of Allowance.
U.S. Appl. No. 14/608,803, dated Aug. 26, 2016, Office Action.
Notice of Allowance dated Jan. 13, 2017 cited in U.S. Appl. No. 14/608,803.

* cited by examiner

TRUST SERVICES FOR SECURING DATA IN THE CLOUD

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, web browsers allow users to access information such as web pages, email, videos, music and other types of data. In some cases, enterprises or other organizations may provide data on these web servers that is intended only for certain users (e.g. employees). In such cases, the employees typically log in and are authenticated before being given access to the data. In other scenarios, enterprises or other organizations may provide some or all of their data via a third party data host such as a cloud hosting company. Such cloud hosting companies may provide the organization's data and/or applications to a wide variety of authenticated and unauthenticated users.

BRIEF SUMMARY

Embodiments described herein are directed to securing data in the cloud, securely encrypting data that is to be stored in the cloud and to securely decrypting data accessed from the cloud. In one embodiment, an instantiated trust service receives information indicating that a trust server is to be instantiated. The trust service instantiates the trust server, which is configured to store key references and encrypted keys. The trust service receives the public key portion of a digital certificate for each publisher and subscriber that is to have access to various specified portions of encrypted data. A data access policy is then defined that specifies which encrypted data portions can be accessed by which subscribers.

In another embodiment, a publisher computer system generates a symmetric key and a symmetric key reference for a publisher according to an administrator-defined policy. The publisher computer system encrypts specified portions of data on the publisher's computer system and encrypts the generated symmetric key using the subscriber's public keys according to the administrator-defined policy to generate new encrypted keys. The new encrypted keys and the symmetric keys reference are then transferred to a trust server for storage by the trust server.

In yet another embodiment, a subscriber computer system requests a specified encrypted key stored on a trust server. The specified encrypted key is decryptable by a subscriber's private key. The subscriber computer system uses the subscriber's private key to decrypt the specified encrypted key to obtain symmetric data encryption key. The subscriber computer system then decrypts the specified portions of data that were encrypted using the symmetric key and accesses the encrypted data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to securing data in the cloud, securely encrypting data that is to be stored in the cloud and to securely decrypting data accessed from the cloud. In one embodiment, an instantiated trust service receives information indicating that a trust server is to be instantiated. The trust service instantiates the trust server, which is configured to store key references and encrypted keys. The trust service receives the public key portion of a digital certificate for each publisher and subscriber that is to have access to various specified portions of encrypted data. A data access policy is then defined that specifies which encrypted data portions can be accessed by which subscribers.

In another embodiment, a publisher computer system generates a symmetric key and a symmetric key reference for a publisher according to an administrator-defined policy. The publisher computer system encrypts specified portions of data on the publisher's computer system and encrypts the generated symmetric key using the subscriber's public keys according to the administrator-defined policy to generate new encrypted keys. The new encrypted keys and the symmetric keys reference are then transferred to a trust server for storage by the trust server.

In yet another embodiment, a subscriber computer system requests a specified encrypted key stored on a trust server. The specified encrypted key is decryptable by a subscriber's private key. The subscriber computer system uses the subscriber's private key to decrypt the specified encrypted key to obtain symmetric data encryption key. The subscriber computer system then decrypts the specified portions of data that were encrypted using the symmetric key and accesses the encrypted data.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a- chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
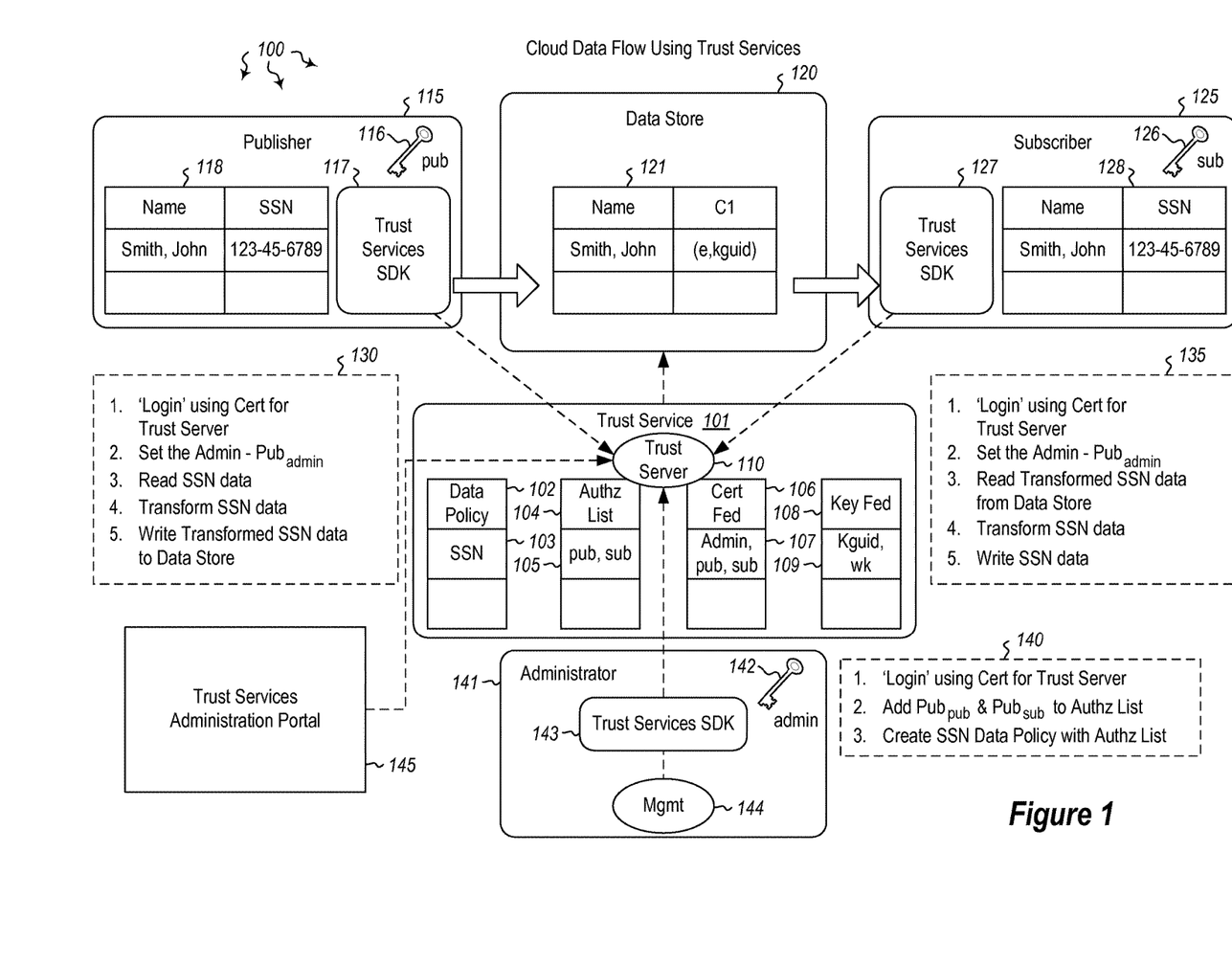
FIG. 1 illustrates a computer architecture in which embodiments described herein may operate including securing data in the cloud.

FIG. 1 illustrates a computer architecture 100 in which at least one embodiment may be employed. Computer architecture 100 includes multiple different nodes and modules including data store 120. The data store may be any type of local or distributed data store, including a cloud data store. The data store 120 may be configured to store various types of information including user data. This user data may be stored in an encrypted form, which prevents the data store from being able to access the data. Data publishers (115) and data subscribers (125) may use trust service 101 to perform the encryption and decryption of the data. The implementation and use of trust service 101 will be described in greater detail below.

The trust service 101 may include or comprise an application programming interface (API) and object model. The trust service may be instantiated on a local computer system or over a plurality of distributed (local and/or remote) computer systems. The trust service provides an independent API and object model for (a) data-policy management and (b) data enciphering mechanisms. Both the trust service policy management API, and the trust service enciphering API reference the applicable data, thereby enabling data-centric security.

A data policy (e.g. 102) can be defined at various levels of granularity including at the granularity of a column. This provides flexibility to secure only specified portions of the data if desired. It also enables sharing of a single copy of data. The separation in the API also allows policy management and data access to be performed by independent roles. This enables multiple different scenarios including the following: (1) data backup to and recovery from the cloud (e.g. by a mobile user or application), (2) data sharing via cloud storage (e.g. collaboration among geographically distributed users in a single organization), (3) data hub functionality (i.e. publishing or subscribing to encrypted data stored in the cloud, e.g. collaboration among users across multiple organizations).

In some embodiments, implementation of trust service 101 may involve a local client component (e.g. an edge compliance module (ECM)) and a public service interface to cloud storage for metadata, policies and intermediate encryption keys used to secure the data. Such an implementation separates data storage from metadata storage (e.g. keys used to encrypt data and associated data policies). This gives users (e.g. customers) multiple options in data storage location while using trust service 101 to secure the data. The local client component, ECM, is stored on and/or installed on each publisher or subscriber computer system. The ECM lies within trust boundaries established by the customer. The ECM applies data transformations (e.g. encryption and decryption), specified by the policies on the data. Protocols for securing the data are thus end-to-end, as policies are applied at the edge, and data is secure at the untrusted intermediary nodes used for data storage (e.g. data store 120) and for communication channels used to transfer data. By stating that protocols for securing the data are end-to-end, it is implicit that there is no requirement of security guarantees from storage and communication channels. This enables users or clients to choose from a wide variety of cloud platform (storage) services.

Trust service metadata (i.e. the hierarchy of keys used for securing the data, the data policies and certificates using for defining the data access policies) is stored encrypted in the cloud in the KeyFed (108) and PolicyFed (102) components respectively. APIs for data-policy management and for data enciphering are separated in trust service 101. Storing the keys in the cloud enables "key roaming", and storing policies in the cloud enables "policy roaming", as will be described further below in relation to method 200 of FIG. 2.

Figure 2:
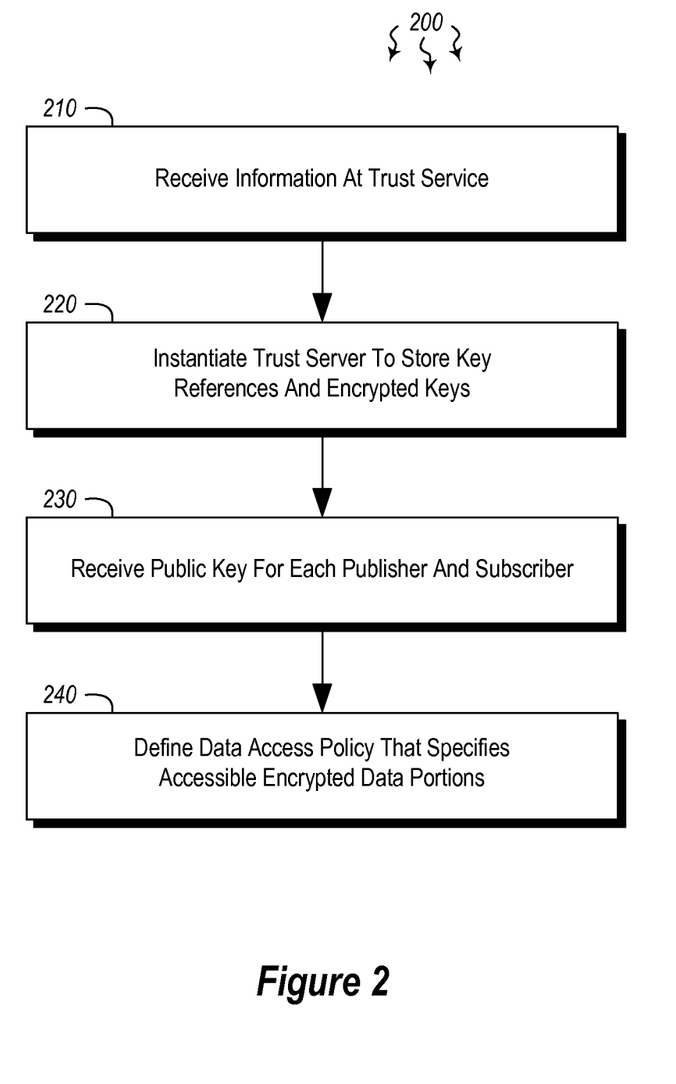
FIG. 2 illustrates a flowchart of an example method for securing data in the cloud.
Figure 4:
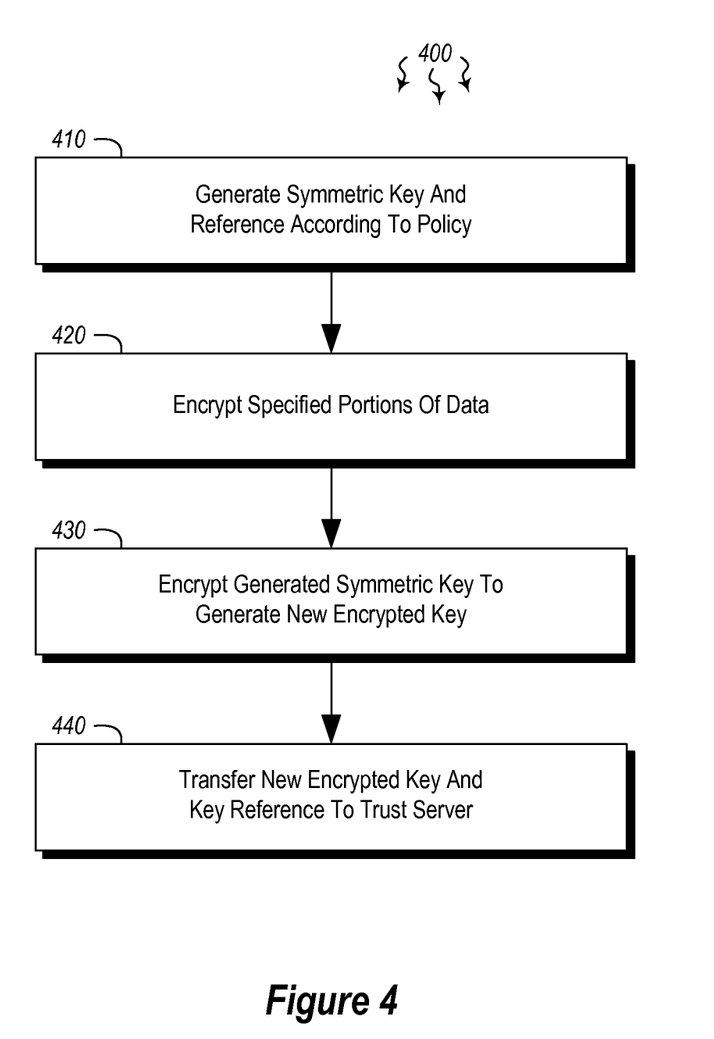
FIG. 4 illustrates a flowchart of an example method for securely encrypting data that is to be stored in the cloud.
Figure 5:
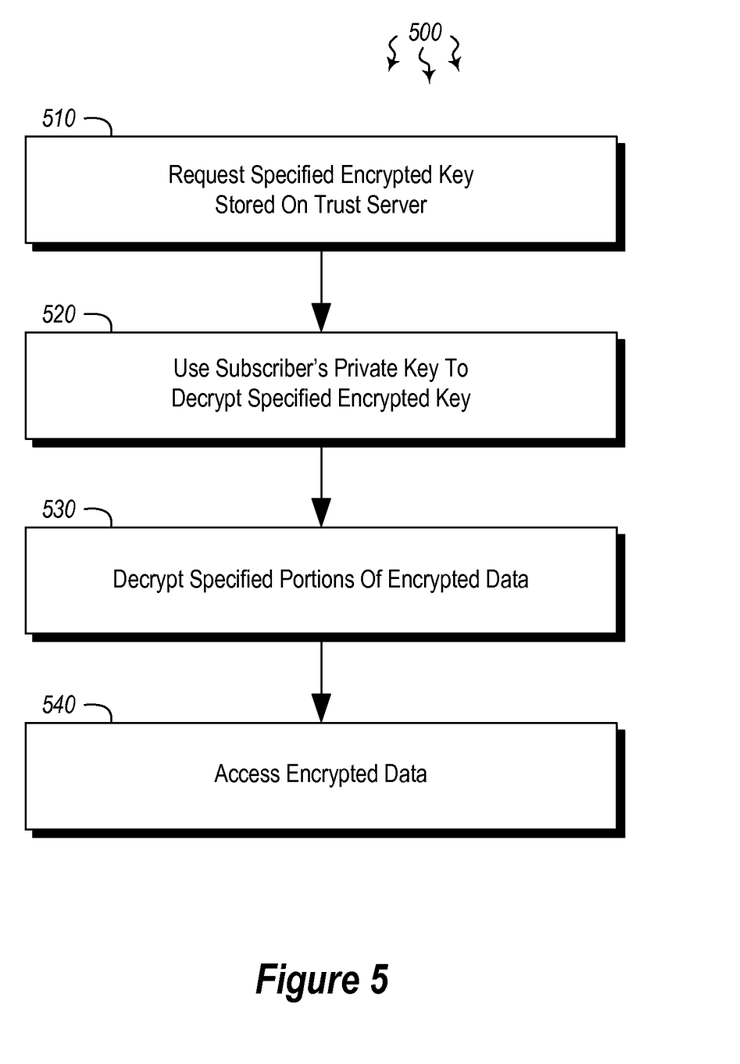
FIG. 5 illustrates a flowchart of an example method for securely decrypting data accessed from the cloud.

In view of the systems and architectures described above, methodologies that may be implemented in accordance with the disclosed subject matter will be better appreciated with reference to the flow charts of FIGS. 2, 4 and 5. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for securing data in the cloud. The method 200 will now be described with frequent reference to the components and data of environment 100.

Method 200 includes an act of receiving information at an instantiated trust service, the information indicating that a trust server is to be instantiated (act 210). For example, trust service 101 may receive information from an administrator 141 indicating that a trust server 110 (or an instance thereof) is to be instantiated on the trust service 101. The information may include login information from the administrator including credentials such as username and password. The administrator 141 may have a trust services application or software development kit (SDK) 143 that allows users within a specified domain (e.g. management domain 144) to access the trust service 101 and/or a trust server 110. The administrator may log in to the trust server via a web portal (e.g. 145), upon which the administrator is authenticated using the credentials he or she provided (see step 1 of box 140). Any action taken by the administrator may be recorded and/or signed using the administrator's certificate/key 142.

Method 200 also includes an act of the trust service instantiating the trust server, the trust server being configured to store key references and encrypted keys (act 220). For example, trust service 101 may instantiate trust server 110. Trust server includes various items including data policies (102), authorization lists (104), certification stores (106) and key stores (108), among other items. The trust service also receives the public key portion (e.g. 116 for publisher 115, and 126 for subscriber 125) of a digital certificate for each publisher and subscriber that is to have access to specified portions of encrypted data (act 230). Each publisher (i.e. a user storing data) and each subscriber (i.e. a user accessing data) that is to be permitted access to the trust service is added to the authorization list 104 as authorized publishers and subscribers 105 (see step 2 in box 140).

Method 200 further includes an act of defining a data access policy that specifies which encrypted data portions can be accessed by which subscribers (act 240). For example, administrator 141 may define data access policy 102, which specifies certain portions of encrypted data that can be accessed by which users (see step 3 of box 140). For example, if a user wanted to keep certain data private, such as user social security numbers SSNs (103), the user would encrypt that data before storing it on the cloud data store 120. Accordingly, the publisher may be able to see the user names and SSNs in their plaintext form (118), while the data store will only see the encrypted version (the encryption process will be explained below).

In some cases, the data access policy 102 that specifies which encrypted data portions can be accessed by which subscribers is itself encrypted. It may be stored in its encrypted form in the trust server 110. The data access policy may be encrypted using the administrator's private key. Accordingly, if multiple administrators access the trust service, each will be able to encrypt his or her policies with his or her own private key. The data access policy defined by the administrator may specify certain portions of data that are to be encrypted. For instance, the administrator may indicate in the data policy 102 certain columns that are to be encrypted, or certain portions of a data blob, or certain types of documents that are to be encrypted. Substantially any portion of data, regardless of size, may be designated for encryption. In this manner, users of the (potentially unsecure) cloud data store 120 may be able to encrypt some or all of the data they store in the cloud data store. Thus, in the example above, if SSNs were stored in a certain column, that column would be encrypted before being uploaded to the cloud data store.

The data access policy 102 may also specify other file access settings. For instance, the administrator, in defining the policy, may indicate which portions of data are readable, which portions of data are editable, which portions of data are executable, and which users are permitted to perform each read, write and/or execute function. These file access settings may be different for each user, and may be different for different documents or portions of information for different users. The administrator thus has control over who can read, edit or execute each portion of information stored on the cloud data store 120.

As will be explained further below with regard to FIG. 5, the subscriber can use their private key 116 to access the information 128 that was encrypted and uploaded by the publisher (information 118). The encrypted data portions 121 stored on the cloud data store 120 are inaccessible to the trust service 101 or to the cloud, as the trust service has no private key that would permit access to the encrypted data portions. The encrypted data is thus only available to trusted entities such as the administrator 141, and those publishers 115 and subscribers 125 designated by the administrator in the authorization list 104.

Figure 3:
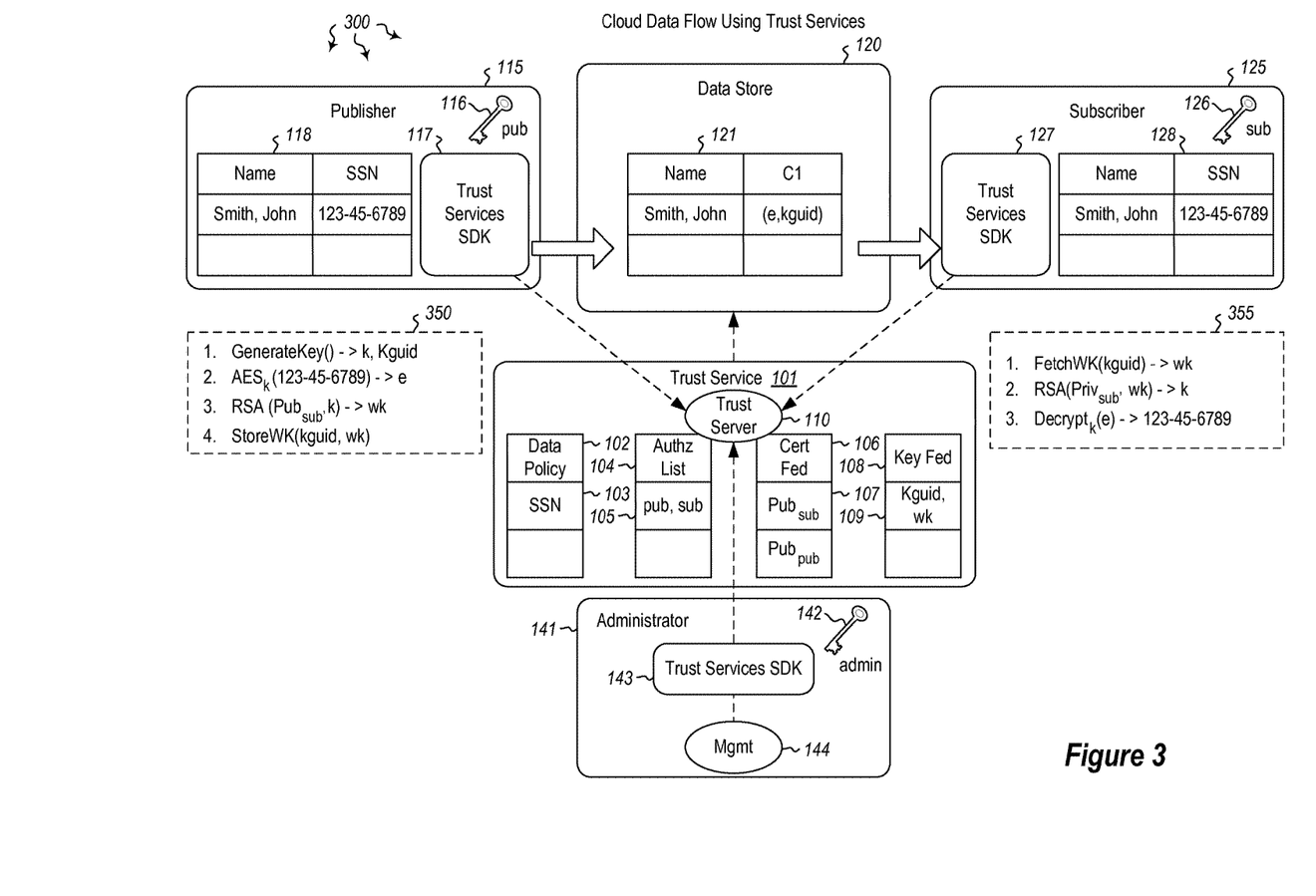
FIG. 3 illustrates another computer architecture in which embodiments described herein may operate including securely encrypting data that is to be stored in the cloud and securely decrypting data accessed from the cloud.

FIG. 3 illustrates a computer architecture similar to that of FIG. 1. FIG. 3 includes a computing environment 300 in which various embodiments described herein may operate. The elements and modules of environment 300 will be explained further below with regard to methods 400 and 500 of FIGS. 4 and 5, respectively. FIG. 4 illustrates a flowchart of a method 400 for securely encrypting data that is to be stored in the cloud. The method 400 will now be described with frequent reference to the components and data of environment 300.

Method 400 includes an act of generating a symmetric key and a symmetric key reference for a publisher according to an administrator-defined policy (act 410). For example, the publisher 115 (or, rather, the publisher's computer system) generates a symmetric key and a symmetric key reference using the client-side application referred to above as the edge compliance module (ECM) which is part of the trust services SDK 127 (see step 1 of box 350). The symmetric key is referred to herein as "k". The symmetric key reference is referred to herein as "kguid". The symmetric key and the symmetric key identifier are both generated according to data policy 102, which is defined by administrator 141.

Then, one or more specified portions of data on the publisher's computer system are encrypted (act 420). This data (such as a social security number or other portion of sensitive or private data) may be encrypted using any type of encryption including advanced encryption standard (AES) or any other type of encryption technique (see step 2 of box 350). This encrypted data is referred to herein as "e". Accordingly, the encrypted data 121 stored on the cloud data store 120 is stored as "(e, kguid)" where the kguid identifies the corresponding encrypted data.

Method 400 also includes an act of encrypting the generated symmetric key using the public key in the encryption process according to the administrator-defined policy, such that a new symmetric key is generated (act 430). Thus, the publisher's computer system can encrypt the publisher's symmetric key (k) using the public key of the subscribers in the encryption process (e.g. using the RSA algorithm) (see step 3 of box 350). The resulting encrypted key is referred to herein as a "wrapped key" or "wk". This new encrypted key (wk) is transferred, along with the key reference (kguid) to the trust server 110 for storage by the trust server (act 440). The trust server 110 thus stores the kguid and wk (109) in the key store (108) (see step 4 of box 350), along with public certificates for publishers and subscribers (107) in the certificate store (106). This data may be used by subscribers to access the data. As will be shown below with regard to method 500, a subscriber may use the encrypted key (wk) and the key identifier (kguid) to decrypt the encrypted key and decrypt the data.

As mentioned above, the publisher may install the ECM client application on the publisher's local computer system. The client application may receive and sending the publisher's login credentials to the trust server 110 (see step 1 of box 130). The login credentials may include the publisher's digital certificate. The publisher may then be authenticated to the trust server using the received login credentials. Once authenticated, the publisher may identify the administrator that approved the publisher in the authorization list 104 and access the locally stored data that is to be encrypted (steps 2 and 3 from box 130). The locally stored data is then encrypted using the steps of box 350 and is transferred to the cloud data store 150 (steps 4 and 5 of box 130). The encryption may occur using one or more of a variety of different encryption methods. The symmetric key k may be used to encrypt at least a portion of data that is to be stored in the cloud data store 120. As mentioned above, the cloud data store may be untrusted by the administrator and/or by the publisher. As such, any data deemed important or private or sensitive is encrypted before being uploaded to the cloud data store. Once encrypted, the cloud data store, as well as any parties not authorized by the administrator, will be unable to access the encrypted data 121.

FIG. 5 illustrates a flowchart of a method 500 for securely decrypting data accessed from the cloud. The method 500 will now be described with frequent reference to the components and data of environment 300.

Method 500 includes an act of requesting a specified encrypted key stored on a trust server, the specified encrypted key being decryptable by a subscriber's private key (act 510). For example, subscriber 125's computer system may request the encrypted key (wk) from the trust server 110 (see step 1 of box 355). The trust server has the encrypted key (wk) stored in key store 108, along with the key identifier (kguid) (109). The encrypted key (wk) is decryptable by the subscriber's private key 126. At least in some embodiments, a separate encrypted key may be generated for each subscriber.

Method 500 next includes an act of using the subscriber's private key to decrypt the specified encrypted key to obtain a publisher's underlying public key (act 520). Thus, subscriber 125's private key 126 may be used to decrypt the encrypted key (wk) to obtain the underlying symmetric key (k) (see step 2 of box 355). The encrypted data 121 stored on the cloud data store 120 may then be decrypted using the symmetric key and the subscriber's private key (act 530) (also, see step 3 of box 355). After the data is decrypted, the data may be accessed in its plaintext form (act 540). Accordingly, using the decryption steps above, a user may securely access data stored on a potentially insecure data store. As shown in box 135, a subscriber may log in using their credentials (step 1), verify that the administrator has added them to the authorization list 104 (step 2), access the encrypted data (step 3), decrypt the data (step 4) and access (i.e. read, write or execute) the decrypted data (step 5).

Accordingly, methods, systems and computer program products are provided which provide secure data in a potentially unsecure cloud data store and securely encrypt data that is to be stored in the cloud. Moreover, methods, systems and computer program products are provided which securely decrypt data accessed from the cloud.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system for providing a secure trust service, the system comprising:
   one or more processors;
   memory; and
   computer-readable storage media having stored thereon computer-executable instructions that, when executed by the one or more processors, configures the computing system to:
      receive information at an instantiated trust service, the information received at the instantiated trust service indicating that a trust server is to be instantiated on the trust service;
      instantiate, by the trust service, the trust server, the trust server comprising a key store configured to store encrypted decryption keys and key identifiers associated with the stored encrypted decryption keys,
         wherein the encrypted decryption keys are available, to authorized subscribers through the trust server by the key identifiers, and
         wherein the encrypted decryption keys can be decrypted by an authorized subscriber using the authorized subscriber's private decryption key not available to the trust server and the decrypted encrypted decryption keys can be used to decrypt particular encrypted data stored in a data store accessible by the trust service;
      receive a public key portion of a digital certificate for each publisher and subscriber that is to have access to one or more specified portions of encrypted data; and
      store a data access policy within the trust service, the data access policy specifying which encrypted data portions stored in the data store accessible by the trust service are accessible by which subscribers.

2. The computer system of claim 1, wherein the computing system is further configured to:
   receive login information from an administrator via a web portal; and
   authenticate the administrator using the login information.

3. The computer system of claim 2, wherein the data access policy that specifies which encrypted data portions can be accessed by which subscribers is itself encrypted.

4. The computer system of claim 3, wherein the data access policy is encrypted using a public key corresponding to the administrator.

5. The computer system of claim 1, wherein the encrypted data portions cannot be decrypted by the trust service, the trust service having no private key that would permit access to the encrypted data portions.

6. The computer system of claim 2, wherein trusted entities include the administrator, one or more publishers and one or more subscribers.

7. The computer system of claim 6, wherein the encrypted data portions are stored on an untrusted data store.

8. The computer system of claim 7, wherein the untrusted data store comprises cloud data storage.

9. The computer system of claim 1, wherein the data access policy specifies one or more data columns that are to be encrypted.

10. The computer system of claim 1, wherein the data access policy identifies one or more portions of a data blob that are to be encrypted using a unique identifier.

11. The computer system of claim 1, wherein the data access policy indicates which portions of data are readable.

12. A computer implemented method for providing a secure trust service, the method performed by executing computer-executable instructions on one or more processors of a computing system, the method comprising:
   receiving information at an instantiated trust service, the information received at the instantiated trust service indicating that a trust server is to be instantiated on the trust service;
   instantiating, by the trust service, the trust server, the trust server comprising a key store configured to store encrypted decryption keys and key identifiers associated with the stored encrypted decryption keys,
      wherein the encrypted decryption keys are available to authorized subscribers through the trust server by the key identifiers, and
      wherein the encrypted decryption keys can be decrypted by an authorized subscriber using the authorized subscriber's private decryption key not available to the trust server and the decrypted encrypted decryption keys can be used to decrypt particular encrypted data stored in a data store accessible by the trust service;
   receiving a public key portion of a digital certificate for each publisher and subscriber that is to have access to one or more specified portions of encrypted data; and
   storing a data access policy within the trust service, the data access policy specifying which encrypted data portions stored in the data store accessible by the trust service are accessible by which subscribers.

13. The method of claim 12, wherein the data access policy that specifies which encrypted data portions can be accessed by which subscribers is itself encrypted.

14. The method of claim 12, wherein the data access policy is encrypted using a public key corresponding to an administrator.

15. The method of claim 12, wherein the encrypted data portions cannot be decrypted by the trust service, the trust service having no private key that would permit access to the encrypted data portions.

16. The method of claim 12, wherein the encrypted data portions are stored on an untrusted data store.

17. A computer program product for providing a secure trust service, the computer program product comprising one or more hardware data storage devices storing computer-executable instructions which, when executed on one or more processors of a computing system, cause the computing system to:
receive information at an instantiated trust service, the information received at the instantiated trust service indicating that a trust server is to be instantiated on the trust service;
instantiate, by the trust service, the trust server, the trust server comprising a key store configured to store encrypted decryption keys and key identifiers associated with the stored encrypted decryption keys,
wherein the encrypted decryption keys are available to authorized subscribers through the trust server by the key identifiers, and
wherein the encrypted decryption keys can be decrypted by an authorized subscriber using the authorized subscriber's private decryption key not available to the trust server and the decrypted encrypted decryption keys can be used to decrypt particular encrypted data stored in a data store accessible by the trust service;
receive a public key portion of a digital certificate for each publisher and subscriber that is to have access to one or more specified portions of encrypted data; and
store a data access policy within the trust service, the data access policy specifying which encrypted data portions stored in the data store accessible by the trust service are accessible by which subscribers.

18. The computer program product of claim 17, wherein the data access policy that specifies which encrypted data portions can be accessed by which subscribers is itself encrypted.

19. The computer program product of claim 17, wherein the data access policy is encrypted using a public key corresponding to an administrator.

20. The computer program product of claim 17, wherein the encrypted data portions are stored in cloud data storage.

\* \* \* \* \*